(12) United States Patent
Bae et al.

(10) Patent No.: US 11,953,948 B2
(45) Date of Patent: Apr. 9, 2024

(54) APPARATUS FOR LOCKING PORTABLE COMPUTER

(71) Applicant: COMXI Co., Ltd., Seoul (KR)

(72) Inventors: Byong Ju Bae, Asan-si (KR); Dong Keun Oh, Siheung-si (KR); Hyun Soo Lim, Cheonan-si (KR); Yong Seop Lee, Incheon (KR)

(73) Assignee: COMXI Co., Ltd., Seoul (KR)

( * ) Notice: Subject to any disclaimer, the term of this patent is extended or adjusted under 35 U.S.C. 154(b) by 0 days.

(21) Appl. No.: 17/977,567

(22) Filed: Oct. 31, 2022

(65) Prior Publication Data

US 2023/0205279 A1 Jun. 29, 2023

(30) Foreign Application Priority Data

Dec. 27, 2021 (KR) .................. 10-2021-0188164
May 20, 2022 (KR) .................. 10-2022-0062329

(51) Int. Cl.
*G06F 1/16* (2006.01)
(52) U.S. Cl.
CPC ................... *G06F 1/1679* (2013.01)
(58) Field of Classification Search
CPC ..... E05B 73/0082; G06F 1/1632; G06F 21/88
See application file for complete search history.

(56) References Cited

U.S. PATENT DOCUMENTS

| 4,918,954 | A | * | 4/1990 | Stickel | .................... E05C 19/06 70/57 |
| 5,052,199 | A | * | 10/1991 | Derman | .............. E05B 73/0082 70/58 |
| 6,216,499 | B1 | * | 4/2001 | Ronberg | ............. E05B 73/0082 361/679.55 |
| 6,308,928 | B1 | * | 10/2001 | Galant | ................ E05B 73/0082 248/553 |
| 6,581,420 | B1 | | 6/2003 | Ling et al. | |
| 7,611,117 | B1 | * | 11/2009 | Lang, Jr. | ................ G06F 1/1611 248/452 |
| 7,850,013 | B1 | * | 12/2010 | Kramer | .................. H05K 7/186 70/DIG. 64 |

(Continued)

FOREIGN PATENT DOCUMENTS

| CN | 113833367 A | 12/2021 |
| JP | 2011-70488 A | 4/2011 |

(Continued)

*Primary Examiner* — Adrian S Wilson
(74) *Attorney, Agent, or Firm* — United One Law Group LLC; Kongsik Kim; Jhongwoo Peck

(57) ABSTRACT

An apparatus for locking a portable computer includes an apparatus body, a first clamping member rotatably coupled to the apparatus body, configured to support a first side of a computer body of the portable computer, and configured to be fitted over a first edge of a display of the portable computer, a slider coupled to the apparatus body to be reciprocally movable, a second clamping member rotatably coupled to the slider while being spaced apart from the first clamping member, configured to support a second side of the computer body of the portable computer, and configured to be fitted over a second edge of the display of the portable computer, and a locking and unlocking unit installed on the apparatus body and configured to selectively restrict or allow movement of the slider.

20 Claims, 13 Drawing Sheets

(56) References Cited

U.S. PATENT DOCUMENTS

| | | | | |
|---|---|---|---|---|
| 8,061,164 B2* | 11/2011 | Johnston | ............ | E05B 73/0082 70/211 |
| 8,646,294 B1* | 2/2014 | Derman | ............ | E05B 73/0082 70/58 |
| 8,783,073 B1* | 7/2014 | Derman | ............ | E05B 73/0005 70/57 |
| 9,194,532 B2* | 11/2015 | Bisesti | ............ | A47F 7/024 |
| D771,052 S * | 11/2016 | Zheng | ............ | D14/434 |
| 9,568,141 B1* | 2/2017 | Zaloom | ............ | F16M 13/00 |
| D792,414 S * | 7/2017 | Floersch | ............ | D14/447 |
| 9,996,710 B2* | 6/2018 | Leyden | ............ | E05B 73/0082 |
| 10,443,274 B2* | 10/2019 | Allen | ............ | G06F 1/1681 |
| 10,646,055 B2* | 5/2020 | Chapuis | ............ | A47F 5/16 |
| D892,123 S * | 8/2020 | Campbell | ............ | D14/434 |
| 10,788,857 B2* | 9/2020 | Huang | ............ | E05B 73/0082 |
| 10,791,638 B2* | 9/2020 | Wu | ............ | H05K 5/0221 |
| 10,907,383 B2* | 2/2021 | Klinkman | ............ | E05B 73/0082 |
| 10,917,986 B2* | 2/2021 | Bautista | ............ | G06F 1/1626 |
| 11,363,895 B2* | 6/2022 | Schuft | ............ | A47F 7/0246 |
| 11,487,325 B2* | 11/2022 | Huang | ............ | E05B 73/0082 |
| 11,649,658 B2* | 5/2023 | Gulick, Jr. | ............ | H04M 1/04 248/551 |
| 11,680,428 B2* | 6/2023 | Chapuis | ............ | F16M 11/22 248/551 |
| 11,739,568 B2* | 8/2023 | Penny | ............ | G06F 1/166 248/551 |
| 2006/0066438 A1* | 3/2006 | Altounian | ............ | G06F 1/1632 340/5.21 |
| 2007/0290115 A1* | 12/2007 | Meyer | ............ | E05B 73/0082 248/346.06 |
| 2010/0079285 A1* | 4/2010 | Fawcett | ............ | G08B 13/149 70/57.1 |
| 2011/0100073 A1* | 5/2011 | Johnston | ............ | E05B 73/0082 70/57.1 |
| 2011/0185776 A1* | 8/2011 | Mahaffey | ............ | F16M 11/2007 70/58 |
| 2012/0074272 A1* | 3/2012 | Hull | ............ | F16M 11/041 248/122.1 |
| 2012/0127651 A1* | 5/2012 | Kwon | ............ | G06F 21/88 361/679.43 |
| 2012/0175474 A1* | 7/2012 | Barnard | ............ | F16M 11/14 248/122.1 |
| 2012/0260698 A1 | 10/2012 | Allen et al. | | |
| 2012/0326003 A1* | 12/2012 | Solow | ............ | F16M 11/041 248/688 |
| 2013/0277520 A1* | 10/2013 | Funk | ............ | G06F 1/1626 248/274.1 |
| 2014/0060218 A1* | 3/2014 | Bisesti | ............ | G01D 11/245 248/274.1 |
| 2014/0328020 A1 | 11/2014 | Galant | | |
| 2015/0083885 A1* | 3/2015 | Mahaffey | ............ | F16M 11/2007 248/551 |
| 2018/0031174 A1* | 2/2018 | Sanders | ............ | F16M 13/022 |
| 2018/0252003 A1* | 9/2018 | Klinkman | ............ | E05B 73/0082 |
| 2019/0281715 A1* | 9/2019 | Bautista | ............ | H05K 5/0221 |

FOREIGN PATENT DOCUMENTS

| | | |
|---|---|---|
| KR | 10-2006-0058860 A | 6/2006 |
| KR | 10-0745709 B1 | 8/2007 |
| KR | 20-0227879 Y1 | 6/2011 |
| KR | 20-0462086 Y1 | 8/2012 |
| KR | 10-2062845 B1 | 1/2020 |
| KR | 10-2382960 B1 | 4/2022 |
| WO | 2018/160854 A1 | 9/2018 |

\* cited by examiner

APPARATUS FOR LOCKING PORTABLE COMPUTER

CROSS REFERENCE TO RELATED APPLICATION(S)

The present application claims priority to Korean Patent Application No. 10-2021-0188164, filed Dec. 27, 2021 and Korean Patent Application No. 10-2022-0062329, filed May 20, 2022, which are incorporated herein by reference in their entireties.

BACKGROUND

1. Field of the Invention

The present disclosure relates generally to an apparatus for locking a portable computer and, more particularly, to an apparatus for locking a portable computer, the apparatus being capable of preventing theft of the portable computer without limiting the use of a port of the portable computer.

2. Description of the Related Art

In general, a computer is composed of hardware and software. Among them, the hardware includes a main body forming the exterior of the computer, that is, a case, and various electronic components installed inside the case. Examples of the electronic components installed inside the case may include an expensive chip, and also include a data storage device in which expensive and important information is stored.

Such a data storage device is detachably installed inside the case, and when very important information is stored therein, it needs to be safely managed in preparation for theft or loss.

Recently, there have been cases in which intruders or non-administrators access a computer of a financial institution or government-affiliated institution and steal data stored in the computer, which is increasingly becoming a social issue. In response to this, several countermeasures have been proposed, but most of them are limited to preventing downloading and stealing data through physical access to the computer. In particular, in the case of a portable electronic device such as a laptop computer, there is no countermeasure against theft of the device itself.

As an example of the related art, there is a technique for locking a computer device by preventing a computer case from being removed or by connecting the case itself to a desk with a chain or wire. However, this related-art method is problematic in that it is difficult to apply to a laptop computer or the like that does not have a structure capable of connecting the chain or wire to the case.

In an effort to solve the above problem, as disclosed in Korean Patent No. 10-2062845, the present applicant has proposed an apparatus for locking a laptop computer by coupling a locking apparatus to a specific connection port of the laptop computer so as not to be removed and then connecting the locking apparatus to a facility or structure with a wire.

The above proposal, however, has some problems. That is, when the locking apparatus is coupled to the specific connection port of the laptop computer, there is the inconvenience of not being able to use the corresponding connection port. Also, when an intruder attempts to pull the wire or remove the locking apparatus, there is the possibility that the connection port to which the locking apparatus is connected may be damaged by excessive force.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide an apparatus for locking a portable computer, the apparatus being capable of preventing theft of the portable computer in a state in which a port of the portable computer is usable by connecting an adaptor to the port.

In order to achieve the above objective, according to one aspect of the present disclosure, there is provided an apparatus for locking a portable computer, the apparatus including: an apparatus body; a first clamping member rotatably coupled to the apparatus body, configured to support a first side of a computer body of the portable computer, and configured to be fitted over a first edge of a display of the portable computer; a slider coupled to the apparatus body to be reciprocally movable; a second clamping member rotatably coupled to the slider while being spaced apart from the first clamping member, configured to support a second side of the computer body of the portable computer, and configured to be fitted over a second edge of the display of the portable computer; and a locking and unlocking unit installed on the apparatus body and configured to selectively restrict or allow movement of the slider.

The first clamping member may include: a first rotating member rotatably coupled to the apparatus body, and configured to support the first side of the computer body; and a first gripping member rotatably coupled to the first rotating member in a direction orthogonal to a rotation direction of the first rotating member, and configured to be fitted over the first edge of the display.

The first gripping member may include: a first channel bracket in which a first gripping recess into which the first edge of the display is fitted is recessed; and a first rotating bracket protruding from the first channel bracket so as to be rotatably coupled to the first rotating member.

The first gripping member may further include: a first extension bracket formed to protrude from the first channel bracket while being spaced apart from the first rotating bracket so as to be supported on the computer body according to rotation of the display.

The second clamping member may include: a second rotating member rotatably coupled to the slider, and configured to support the second side of the computer body; and a second gripping member rotatably coupled to the second rotating member in a direction orthogonal to a rotation direction of the second rotating member, and configured to be fitted over the second edge of the display.

The second gripping member may include: a second channel bracket in which a second gripping recess into which the second edge of the display is fitted is recessed; and a second rotating bracket protruding from the second channel bracket so as to be rotatably coupled to the second rotating member.

The second gripping member may further include: a second extension bracket formed to protrude from the second channel bracket while being spaced apart from the second rotating bracket so as to be supported on the computer body according to rotation of the display.

The apparatus body may include: a body housing disposed on a rear edge of the computer body, and on which the locking and unlocking unit is installed; and a guide rail provided in the body housing so that the first clamping member is rotatably coupled to the guide rail, and to which the slider is coupled to be reciprocally movable.

The slider may include: a plurality of engaging patterns arranged to be spaced apart from each other along a reciprocating movement direction of the slider, and configured to be selectively engaged with the locking and unlocking unit.

The locking and unlocking unit may include: a latch member installed on the apparatus body; a latch ring member coupled to the latch member by passing therethrough so as to be reciprocally movable; a locking member connected to the latch ring member, and configured to be moved between a locking position locked to the slider and an unlocking position unlocked from the slider according to a movement direction of the latch ring member; and an elastic member configured to elastically press the locking member so as to allow the locking member to be moved to the locking position.

The locking member may include: a locking body coupled to the latch ring member; an elastic support portion bent and extended from the locking body, and coupled to the latch member; and a locking engaging portion bent and extended from the locking body, and configured to be engaged with or disengaged from the engaging patterns of the slider according to a change in posture of the locking body.

The apparatus may further include: a hub unit coupled to the apparatus body; and a cover member coupled to at least one of the apparatus body and the hub unit so as to cover the apparatus body and the hub unit.

According to the present disclosure, it is possible to implement an apparatus for locking a portable computer, the apparatus being capable of preventing theft of the portable computer in a state in which a port of the portable computer is usable by connecting an adaptor to the port. In particular, the apparatus for locking the portable computer according to the present disclosure can be firmly coupled to the portable computer, so that it is possible to prevent the apparatus according to the present disclosure from being removed from the portable computer, and to prevent the apparatus according to the present disclosure from being unintentionally separated from the portable computer. Furthermore, the apparatus according to the present disclosure can be stored in a compact size when not in use, thereby facilitating storage and packaging.

Furthermore, with the configuration of a first clamping member, a display can be freely rotated relative to a computer body, and a rotational movement range of the display can be restricted so as not to completely cover the computer body.

Furthermore, with the configuration of a first gripping member, gripping force on the display can be increased, and the display can be prevented from being separated from a first channel bracket. Furthermore, the maximum folding angle of the display relative to the computer body can be set through a first extension bracket.

Furthermore, with the configuration of a second clamping member, the display can be freely rotated relative to the computer body, and a rotational movement range of the display can be restricted so as not to completely cover the computer body.

Furthermore, with the configuration of a second gripping member, gripping force on the display can be increased, and the display can be prevented from being separated from a second channel bracket. Furthermore, the maximum folding angle of the display relative to the computer body can be set through a second extension bracket.

Furthermore, with the configuration of an apparatus body, a smooth coupling of a slider can be achieved.

Furthermore, with the configuration of the slider, locking engagement of a locking and unlocking unit can be reliably achieved.

Furthermore, with the configuration of the locking and unlocking unit, a locked state and an unlocked state can be reliably achieved, and sliding movement of the slider can be prevented.

Furthermore, with the configuration of a locking member, locking engagement between a locking member and engaging patterns can be reliably achieved in the locked state and the unlocked state according to a change in the posture of a locking body.

Furthermore, with the configuration of a hub unit, the hub unit can be integrated into the apparatus according to the present disclosure so that the hub unit can be used by connecting to a port of the portable computer, thereby facilitating convenience and expandability of use.

Furthermore, with the configuration of a cover member, the hub unit coupled to the apparatus body can be protected from the outside.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
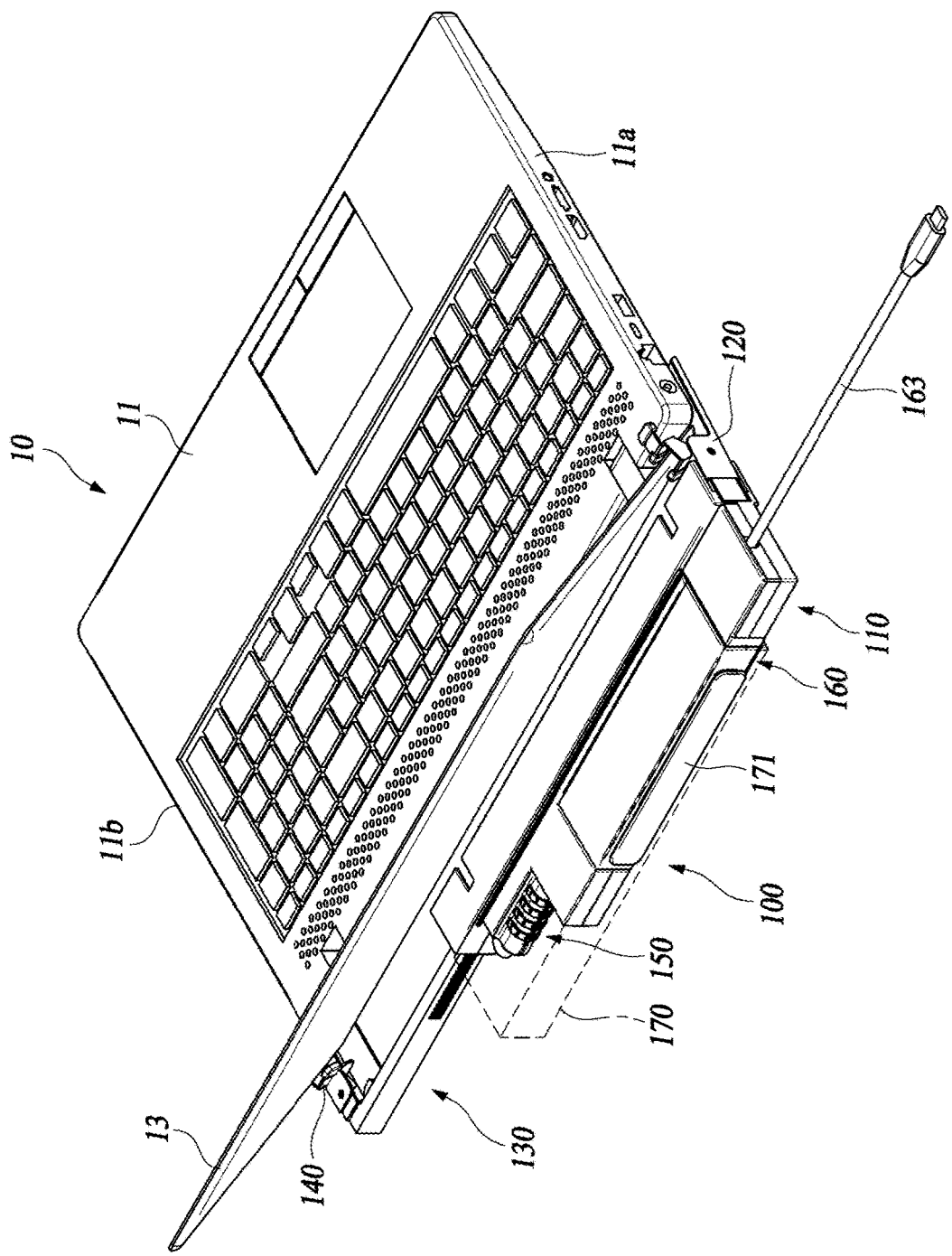
FIG. 1 is a perspective view illustrating a state in which an apparatus for locking a portable computer, according to an embodiment of the present disclosure, is coupled to a portable computer.
Figure 2:
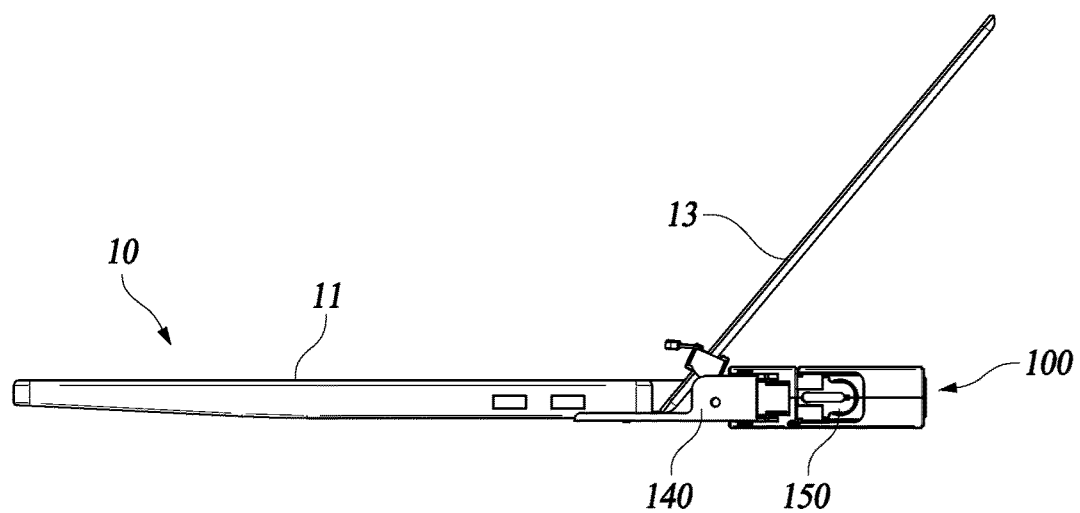
FIG. 2 is a right side view of FIG. 1.
Figure 3:
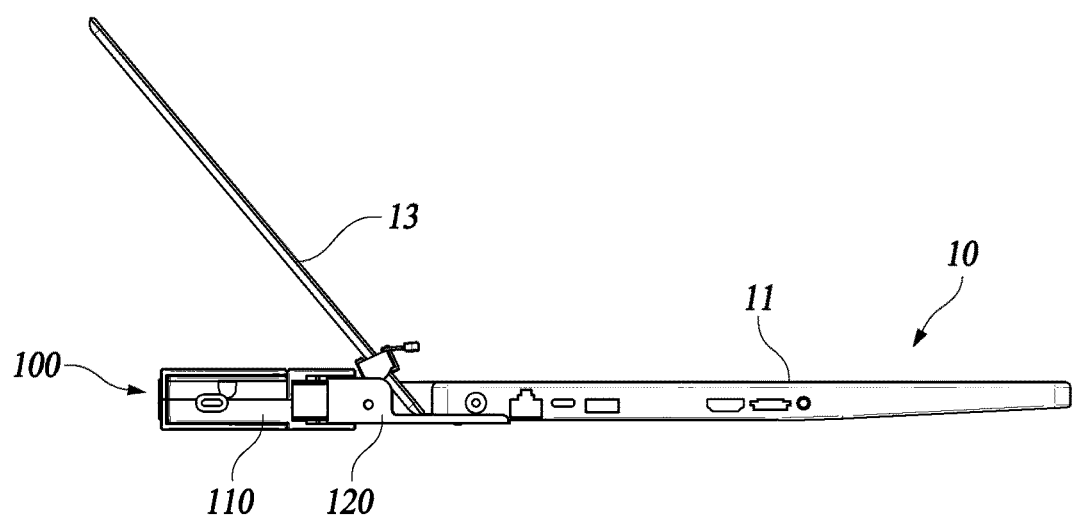
FIG. 3 is a left side view of FIG. 1.
Figure 4:
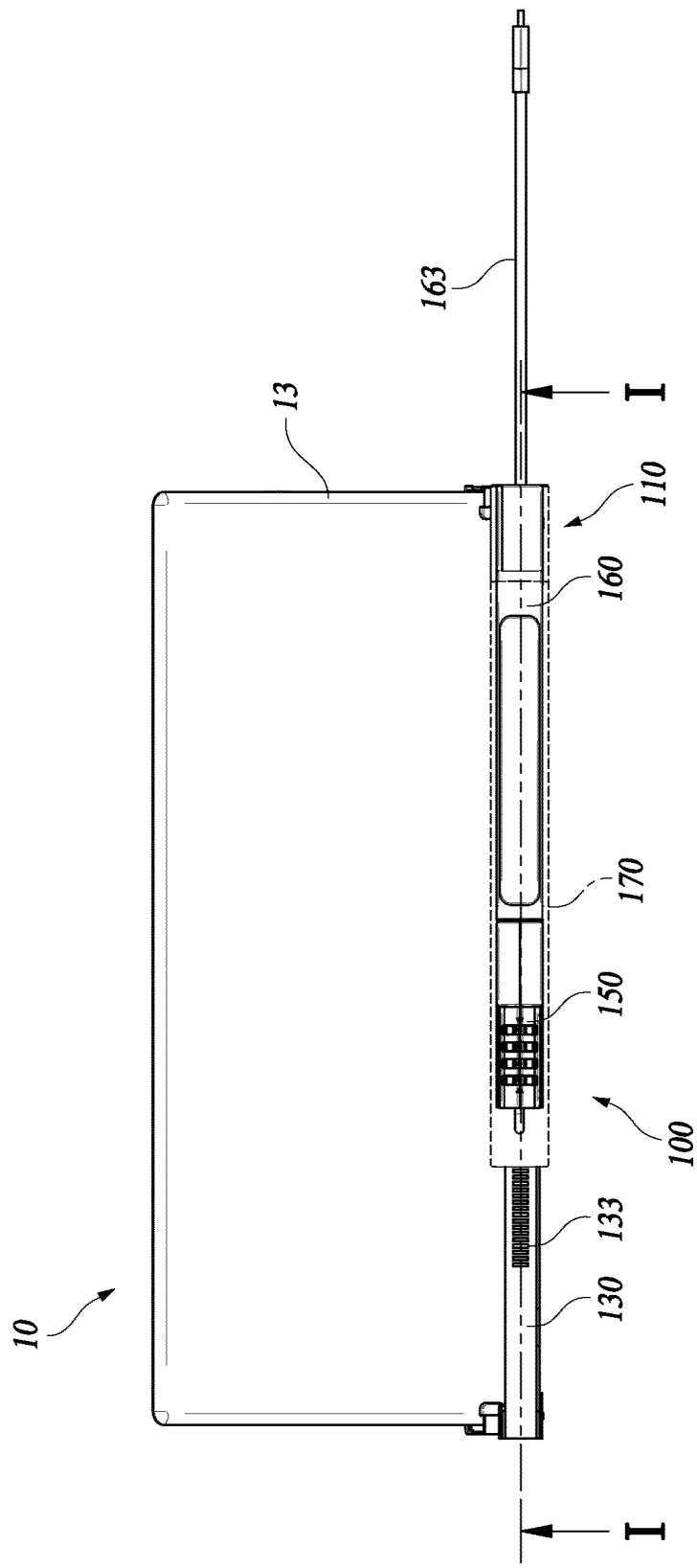
FIG. 4 is a rear view of FIG. 1.
Figure 5:
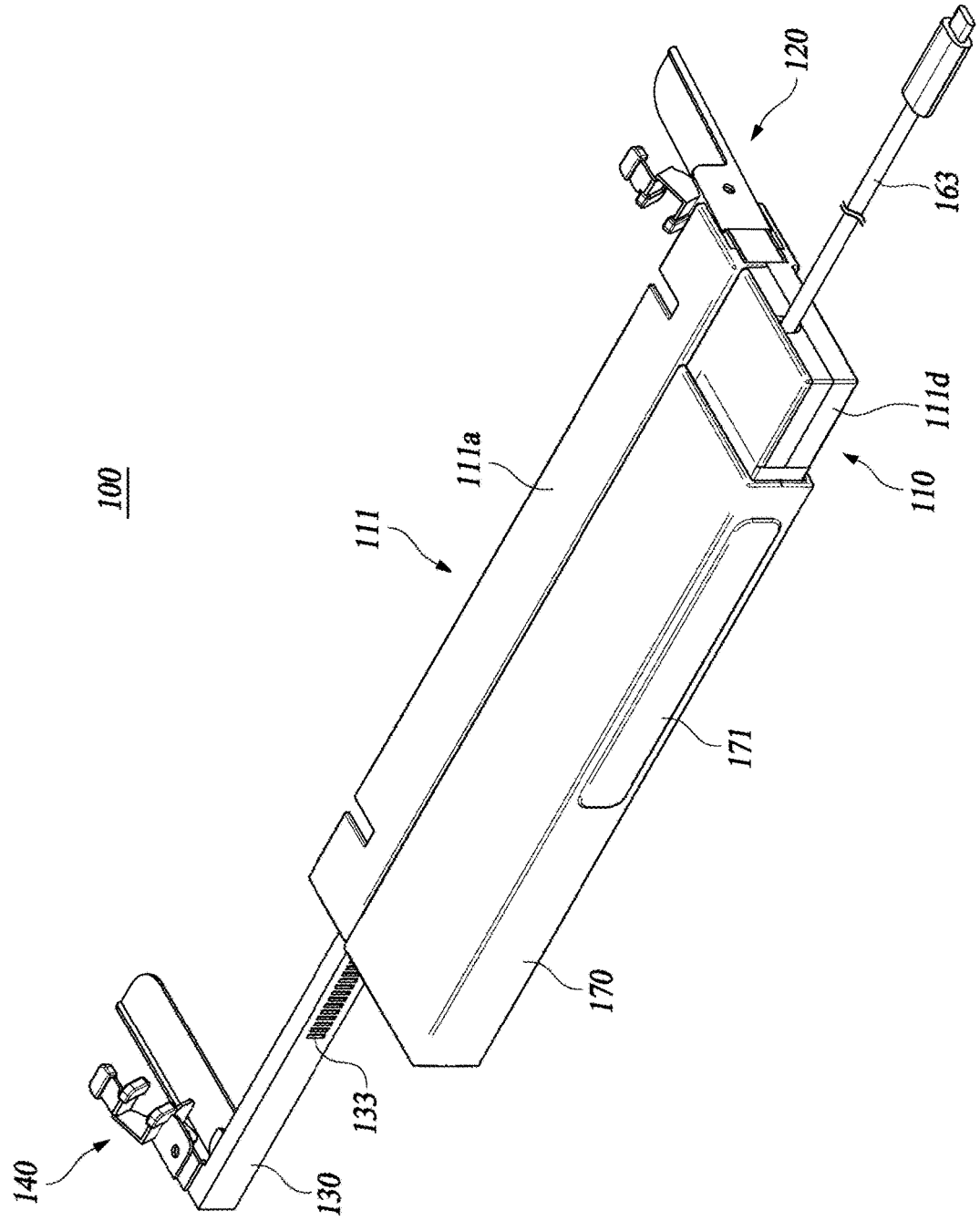
FIG. 5 is a perspective view illustrating the apparatus for locking the portable computer according to the embodiment of the present disclosure.
Figure 6:
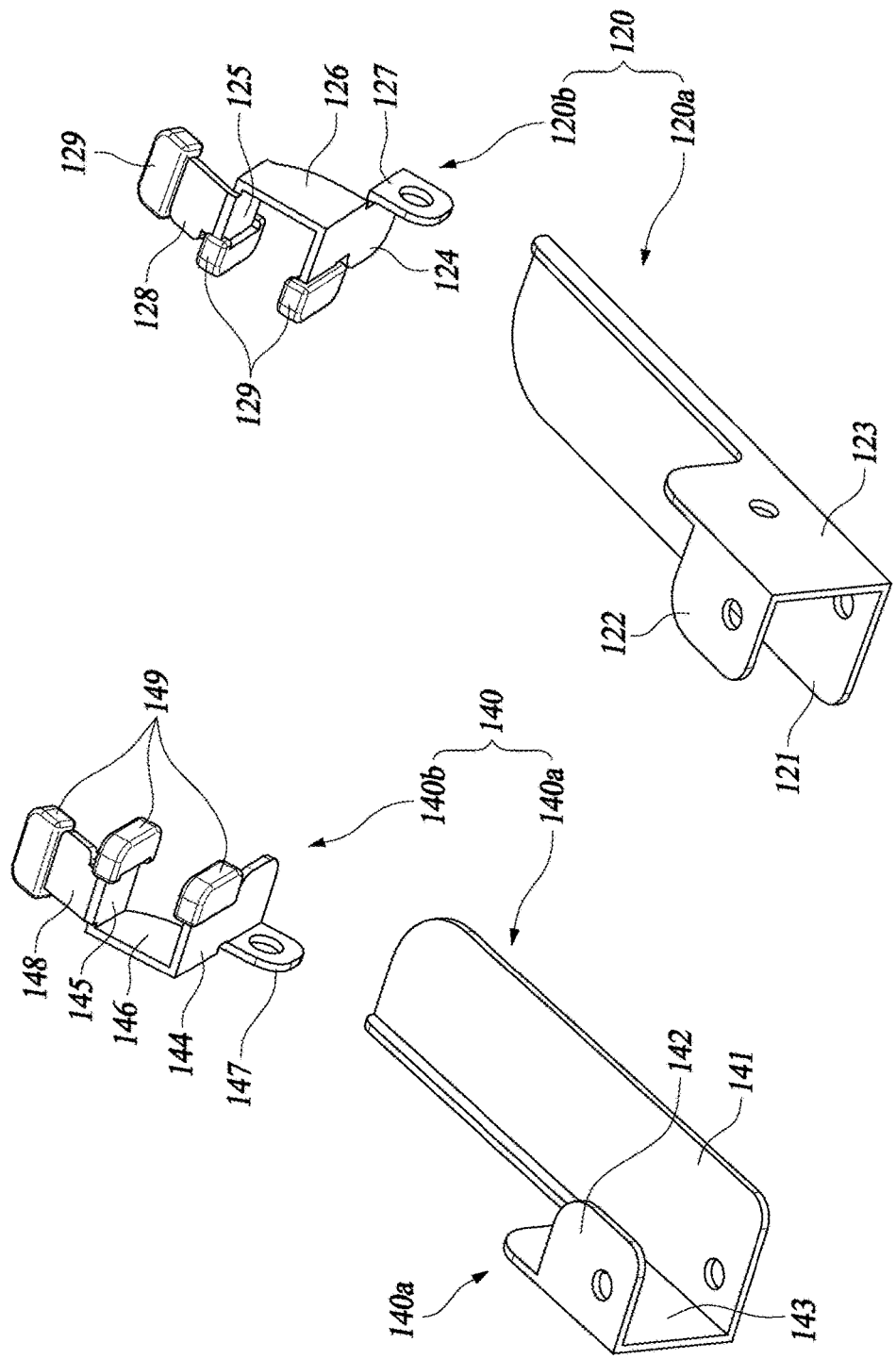
FIG. 6 is a main-part enlarged perspective view illustrating a first clamping member and a second clamping member in the apparatus for locking the portable computer according to the embodiment of the present disclosure.
Figure 7:
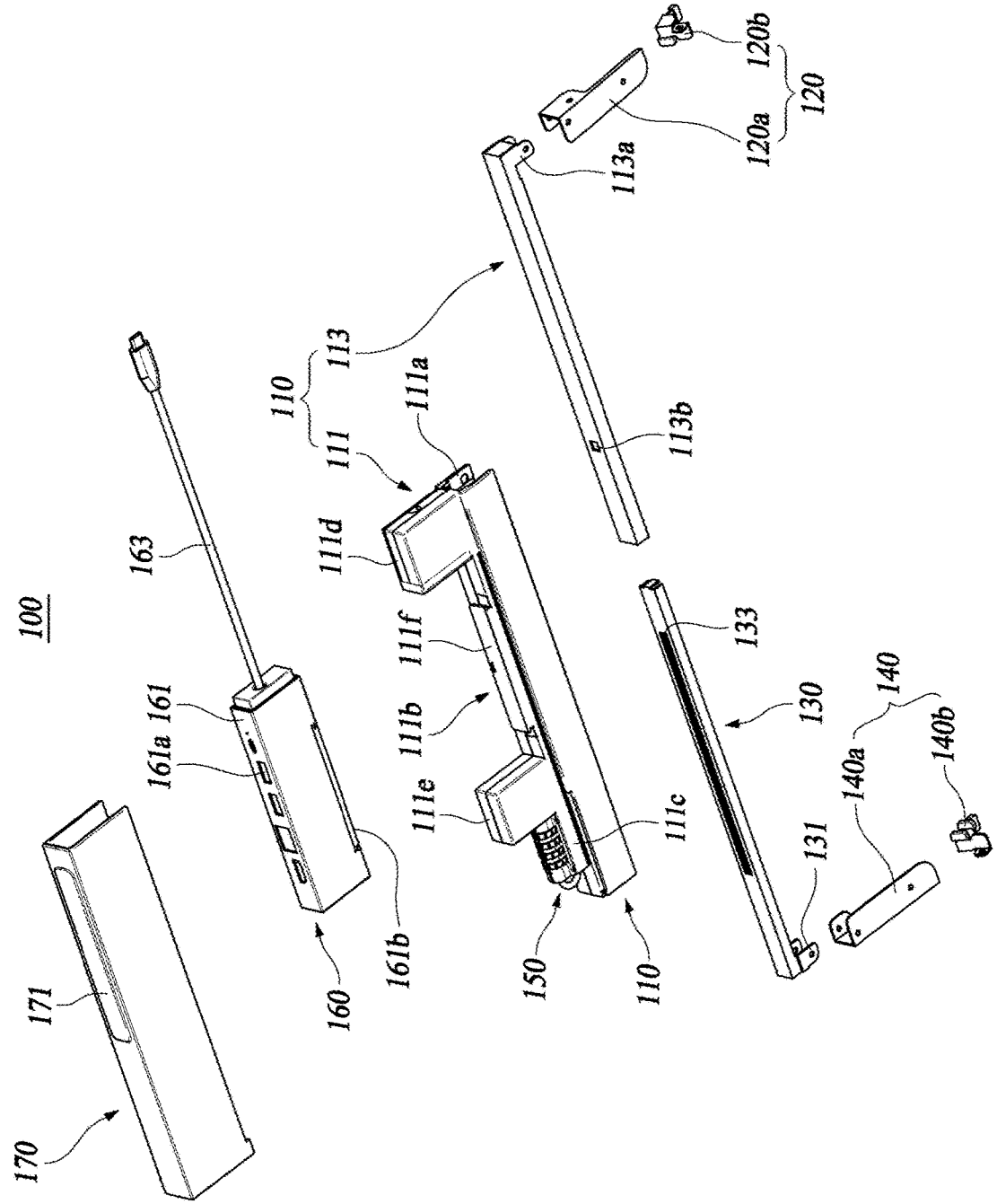
FIG. 7 is a bottom exploded perspective view illustrating the apparatus for locking the portable computer according to the embodiment of the present disclosure.
Figure 8:
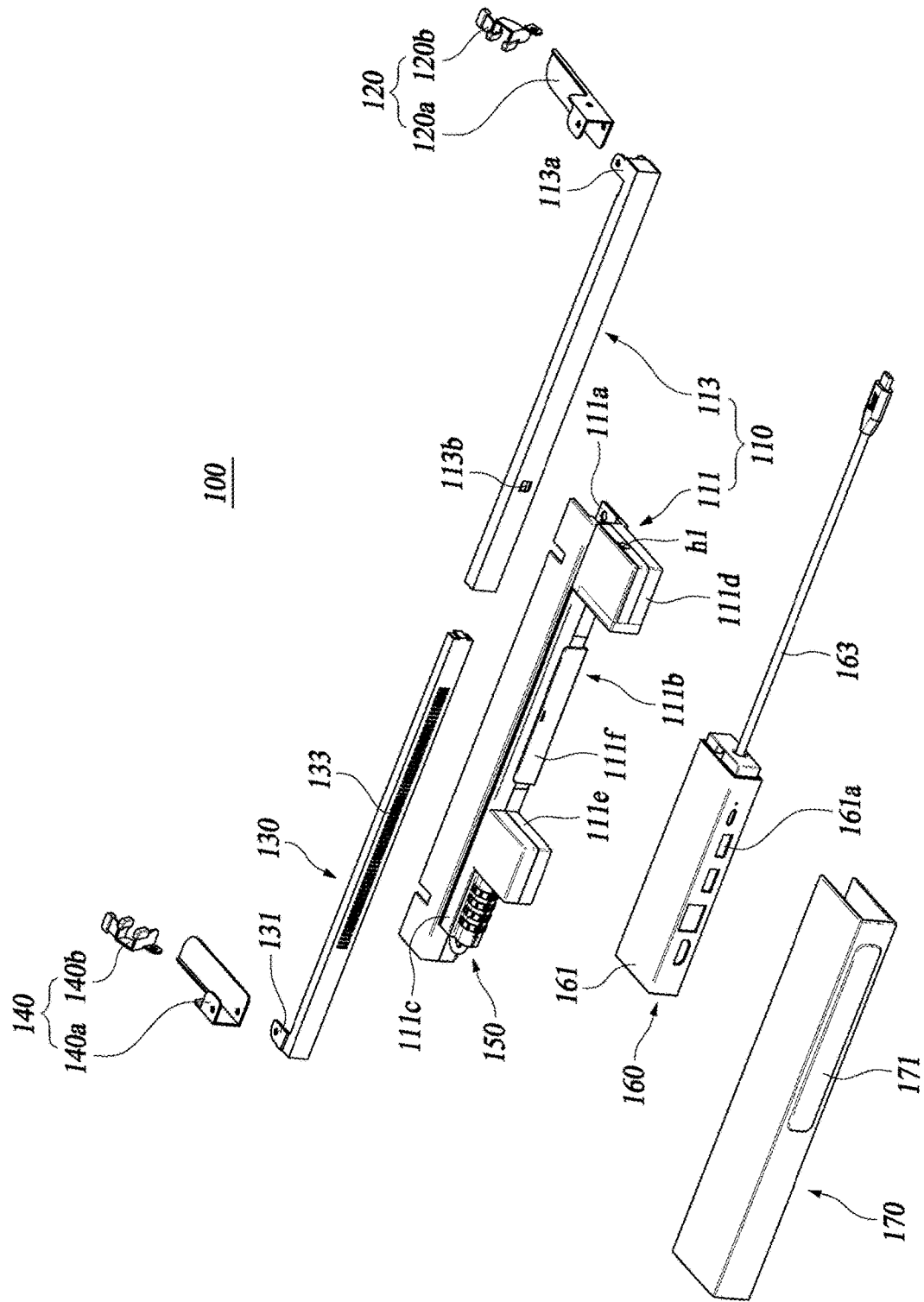
FIG. 8 is a plan exploded perspective view illustrating the apparatus for locking the portable computer according to the embodiment of the present disclosure.
Figure 9:
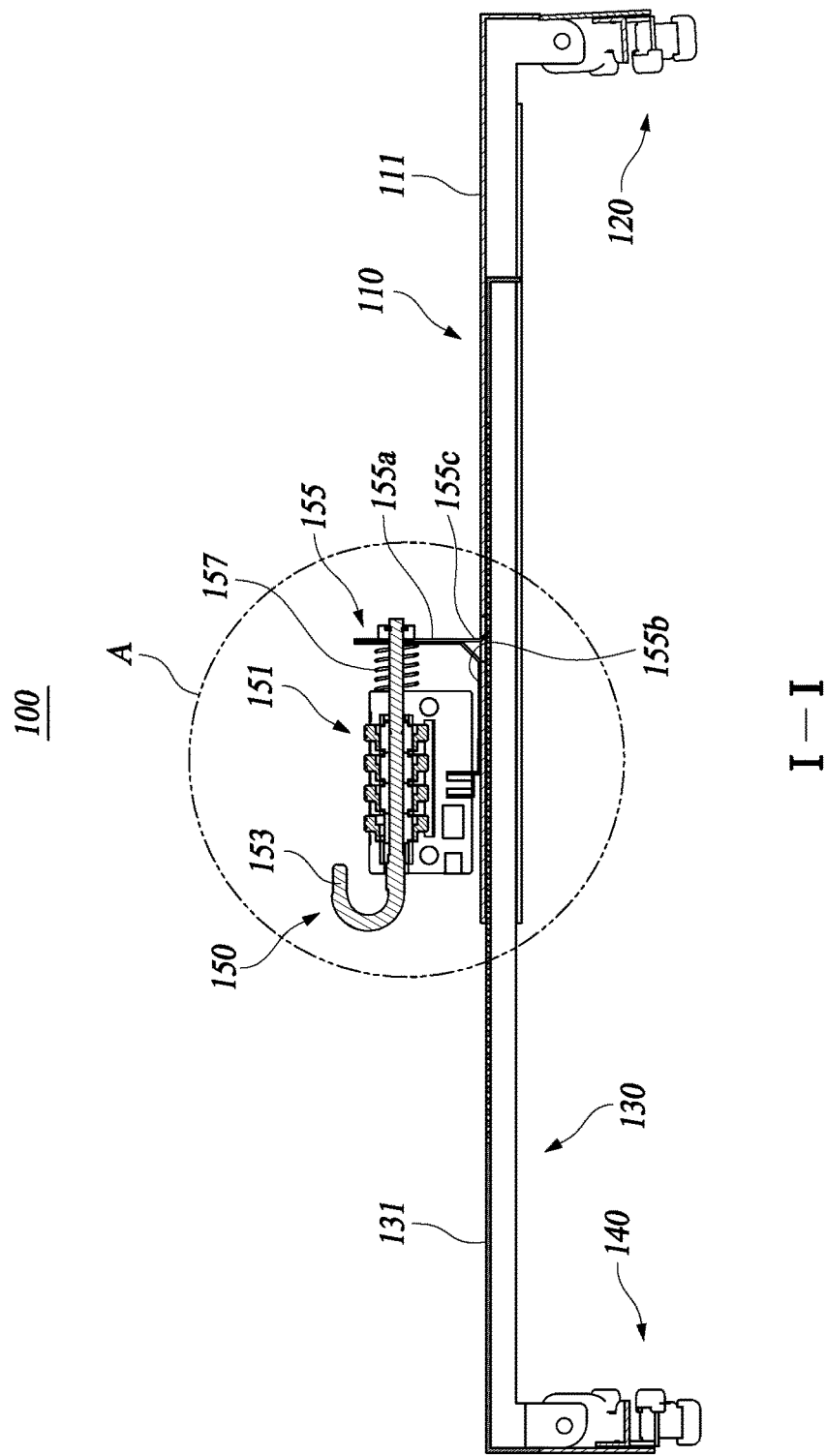
FIG. 9 is a sectional view taken along line I-I of FIG. 4.

The above and other objectives, features, and advantages of the present disclosure will be clearly understood from the more particular description of exemplary embodiments of the present disclosure. The present disclosure may, however, be embodied in different forms and should not be construed as limited to the embodiments set forth herein. Rather, these embodiments are provided so that this disclosure is thorough and complete and fully conveys the present disclosure to those skilled in the art.

It will be understood that, when an element is referred to as being on another element, it can be formed directly on the other element or intervening elements may be present therebetween. Further, in the drawings, the thicknesses of elements may be exaggerated for effective explanation of technical contents.

It will be understood that, although the terms first, second, etc. may be used herein to describe various elements, these elements should not be limited by these terms. These terms are only used to distinguish one element from another. The embodiments described and illustrated herein include their complementary embodiments.

Further, it should be understand that when a first element (or component) is referred to as being operated or executed on a second element (or component), the first element (or component) is operated or executed in the environment in which a second element (or component) is operated or executed, or the second element (or component) is operated or executed through direct or indirect interaction.

It should be understand that when an element, component, device, or system is referred to as including a component composed of a program or software, the element, component, device, or system includes hardware (e.g., memory, CPU, etc.) necessary for the program or software to execute or operate, or other programs or software (e.g., drivers necessary to run an operating system or hardware), unless otherwise specified.

Further, it should be understood that in the implementation of an element (or component), the element (or component) may be implemented in software, hardware, or any form of software and hardware, unless otherwise specified.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising", "includes", and/or "including", when used herein, do not preclude the presence or addition of one or more other elements.

Hereinafter, an apparatus 100 for locking a portable computer 10 according to an embodiment of the present disclosure will be described with reference to FIGS. 1 to 13.

The apparatus 100 for locking a portable computer 10 according to the embodiment of the present disclosure prevents theft of the portable computer 10 in a state in which a specific port provided on a side of the portable computer 10, that is, a laptop computer, is usable.

Here, the portable computer 10 includes a computer body 11 provided with an input keyboard, and a display 13 rotatably coupled to the computer body 11. The computer body 11 may have a first lateral edge 11a provided with a USB A-port, a micro SD port, etc., and a second lateral edge 11b provided with various types of ports, for example, a USB A-port, a USB C-port, a LAN port, an HDMI port, a headphone port, and a power port.

The apparatus 100 for locking the portable computer 10 according to the embodiment of the present disclosure may include an apparatus body 110, a first clamping member 120, a slider 130, a second clamping member 140, and a locking and unlocking unit 150.

The apparatus body 110 may include a body housing 111 and a guide rail 113.

The body housing 111 is disposed on a rear edge of the computer body 11. The locking and unlocking unit 150 is installed on the body housing 111.

The body housing 111 may include a rail coupling portion 111a to which the guide rail 113 is coupled to a front surface thereof, a first mounting portion 111b provided on a rear surface of the rail coupling portion 111a, and a second mounting portion 111c protruding from the first mounting portion 111b and to which the locking and unlocking unit 150 is mounted.

The rail coupling portion 111a has a substantially "C" shape, and the guide rail 113 is inserted and fixed inside the rail coupling portion 111a. A hub unit 160 which will be described later is detachably coupled to the first mounting portion 111b.

The first mounting portion 111b may include a first support wall 111d and a second support wall 111e that are spaced apart from each other and protrude from the rear surface of the rail coupling portion 111a. A mounting space in which the hub unit 160 which will be described later is coupled is secured between the first support wall 111d and the second support wall 111e. The first mounting portion 111b may include a fastening rib 111f provided between the first support wall 111d and the second support wall 111e on the rear surface of the rail coupling portion 111a. The hub unit 160 which will be described later is detachably coupled to the fastening rib 111f.

The second mounting portion 111c is formed to protrude from the second support wall 111e on the rear surface of the rail coupling portion 111a. The locking and unlocking unit 150 is coupled to the second mounting portion 111c. In addition, a cable coupling hole h1 to which a signal cable 163 of the hub unit 160 which will be described later is coupled by passing therethrough is formed in the first support wall 111d.

The guide rail 113 is coupled to the front surface of the rail coupling portion 111a in the body housing 111 so that the first clamping member 120 is rotatably coupled to the guide rail 113. The slider 130 is coupled to the guide rail 113 so as to be reciprocally movable. The guide rail 113 may have a quadrangular frame structure. A first hinge connection portion 113a to which the first clamping member 120 is rotatably coupled may be formed to protrude from the guide rail 113. A through-hole 113b may be formed through the guide rail 113 so as to be spaced apart from the first hinge connection portion 113a.

The first clamping member 120 is rotatably coupled to the apparatus body 110. The first clamping member 120 is coupled to the first hinge connection portion 113a provided at an end of the apparatus body 110 so as to be rotatable by 90 degree angles. The first clamping member 120 supports a first side of the computer body 11 of the portable computer 10, and is fitted over a first edge of the display 13 of the portable computer 10.

In more detail, the first clamping member 120 is stored in a state overlapping with the apparatus body 110, and when rotated by 90 degree angles about the first hinge connection portion 113a, protrudes from the apparatus body 110 by maintaining a state rotated by 90 degree angles relative to the apparatus body 110. In the state in which rotated by 90 degree angles relative to the apparatus body 110, the first clamping member 120 is no longer rotated by more than 90 degree angles. Also, in the state rotated by 90 degree angles relative to the apparatus body 110, the first clamping member 120 is stacked and supported on a first side of a lower portion of the computer body 11, that is, on the first side of the computer body 11, and is fitted over the first edge of the display 13.

The first clamping member 120 may include a first rotating member 120a rotatably coupled to the apparatus body 110 and supporting the first side of the computer body 11, and a first gripping member 120b rotatably coupled to the first rotating member 120a in a direction orthogonal to the rotation direction of the first rotating member 120a and fitted over the first edge of the display 13.

The first rotating member 120a may include a first body support portion 121 rotatably coupled to the first hinge connection portion 113a of the guide rail 113 of the apparatus body 110 and stacked and supported on the first side lower portion of the computer body 11, and a first rotating support portion 123 formed to be bent from the first body support portion 121 and to which the first gripping member 120b is rotatably coupled.

The first rotating member 120a may further include a first gripping stop portion 122 formed to be bent from the first rotating support portion 123 so as to face the first body support portion 121, and rotatably coupled to the first hinge connection portion 113a of the guide rail 113 of the apparatus body 110. The first gripping stop portion 122 may restrict rotation of the first gripping member 120b.

Although not illustrated, the first rotating member 120a may further include an "L"-shaped first gripping angle formed to be bent from the first body support portion 121 so as to be fitted over the first lateral edge 11a of the computer body 11. The first gripping angle does not interfere with a port.

The first gripping member 120b may include a first channel bracket in which a first gripping recess into which the first edge of the display 13 is fitted is recessed, and a first rotating bracket 127 protruding from the first channel bracket so as to be rotatably coupled to the first rotating support portion 123 of the first rotating member 120a.

The first channel bracket has a "C" shape, and may include a first-first gripping portion 124 provided with the first rotating bracket 127, a first connection portion 126 formed to be bent from the first-first gripping portion 124, and a first-second gripping portion 125 formed to be bent from the first connection portion 126 so as to face the first-first gripping portion 124. The first gripping recess is formed between the first-first gripping portion 124 and the first-second gripping portion 125.

The first gripping member 120b may further include a first extension bracket 128 formed to protrude from the first channel bracket while being spaced apart from the first rotating bracket 127 so as to be supported on the computer body 11 according to rotation of the display 13.

The first gripping member 120b may further include a first support cushion portion 129 surrounding a part of entirety of each of the first-first gripping portion 124, the first-second gripping portion 125, and the first extension bracket 128 in order to prevent the portable computer 10 from being scratched by the first gripping member 120b.

The slider 130 is coupled to the apparatus body 110 so as to be reciprocally movable. The slider 130 may have a bar shape or a quadrangular frame shape. The slider 130 is coupled to the guide rail 113 of the apparatus body 110 so as to be reciprocally movable, and may adjust the amount of protrusion from the apparatus body 110. A second hinge connection portion 131 to which the second clamping member 140 is rotatably coupled may protrude from a free end of the slider 130. In addition, the slider 130 may have a plurality of engaging patterns 133 arranged to be spaced apart from each other along the reciprocating movement direction of the slider 130, and selectively engaged with the locking and unlocking unit 150. The engaging patterns 133 may be configured in the form of a plurality of recesses, a plurality of holes, or a plurality of protrusions, and are arranged to be spaced apart from each other along the reciprocating movement direction of the slider 130.

The second clamping member 140 is rotatably coupled to the slider 130 while being spaced apart from the first clamping member 120. The second clamping member 140 is coupled to the second hinge connection portion 131 provided at the free end of the slider 130 so as to be rotatable by 90 degree angles. The second clamping member 140 supports a second side of the computer body 11 of the portable computer 10, and is fitted over a second edge of the display 13 of the portable computer 10.

In more detail, the second clamping member 140 is stored in a state overlapping with the slider 130, and when rotated by 90 degree angles about the second hinge connection portion 131, protrudes from the slider 130 by maintaining a state rotated by 90 degree angles relative to the slider 130. In the state rotated by 90 degree angles relative to the slider 130, the second clamping member 140 is no longer rotated by more than 90 degree angles. Also, in the state rotated by 90 degree angles relative to the slider 130, the second clamping member 140 is stacked and supported on a second side lower portion of the computer body 11, that is, on the second side of the computer body 11, and is fitted over the second edge of the display 13.

The second clamping member 140 may include a second rotating member 140a rotatably coupled to the slider 130 and supporting the second side of the computer body 11, and a second gripping member 140b rotatably coupled to the second rotating member 140a in a direction orthogonal to the rotation direction of the second rotating member 140a and fitted over the second edge of the display 13.

The second rotating member 140a may include a second body support portion 141 rotatably coupled to the second hinge connection portion 131 of the slider 130 and stacked and supported on the second side lower portion of the computer body 11, and a second rotating support portion 143 formed to be bent from the second body support portion 141 and to which the second gripping member 140b is rotatably coupled.

The second rotating member 140a may further include a second gripping stop portion 142 formed to be bent from the second rotating support portion 143 so as to face the second body support portion 141, and rotatably coupled to the second hinge connection portion 131 of the slider 130. The second gripping stop portion 142 may restrict rotation of the second gripping member 140b.

Although not illustrated, the second rotating member 140a may further include an "L"-shaped second gripping angle formed to be bent from the second body support portion 141 so as to be fitted over the second lateral edge 11b of the computer body 11. The second gripping angle does not interfere with a port.

The second gripping member 140b may include a second channel bracket in which a second gripping recess into which the second edge of the display 13 is fitted is recessed, and a second rotating bracket 147 protruding from the second channel bracket so as to be rotatably coupled to the second rotating support portion 143 of the second rotating member 140a.

The second channel bracket has a "C" shape, and may include a second-first gripping portion 144 provided with the second rotating bracket 147, a second connection portion 146 formed to be bent from the second-first gripping portion 144, and a second-second gripping portion 145 formed to be bent from the second connection portion 146 so as to face the second-first gripping portion 144. The second gripping recess is formed between the second-first gripping portion 144 and the second-second gripping portion 145.

The second gripping member 140b may further include a second extension bracket 148 formed to protrude from the second channel bracket while being spaced apart from the second rotating bracket 147 so as to be supported on the computer body 11 according to rotation of the display 13.

The second gripping member 140b may further include a second support cushion portion 149 surrounding a part of entirety of each of the second-first gripping portion 144, the second-second gripping portion 145, and the second extension bracket 148 in order to prevent the portable computer 10 from being scratched by the second gripping member 140b.

The locking and unlocking unit 150 is installed on the apparatus body 110 and selectively restricts or allows movement of the slider 130.

The locking and unlocking unit 150 may include a latch member 151 installed on the apparatus body 110, a latch ring member 153 coupled to the latch member 151 by passing therethrough so as to be reciprocally movable, a locking member 155 connected to the latch ring member 153 and moved between a locking position locked to the slider 130 and a unlocking position unlocked from the slider 130 according to the movement direction of the latch ring member 153, and an elastic member 157 elastically pressing the locking member 155 so as to allow the locking member 155 to be moved to the locking position. The elastic member 157 elastically presses the locking member 155 in a direction to be engaged with the engaging patterns 133 of the slider 130.

The latch member 151 may include a latch body 151a coupled to the second mounting portion 111c of the apparatus body 110, and a key portion 151b installed on the latch body 151a and selectively restricting or allowing movement of the latch ring member 153. The key portion 151b controls an operating shaft 153a of the latch ring member 153 to be moved forward or backward in the latch body 151a, and may have a structure composed of a plurality of number keys. Of course, in addition to the configuration of the number keys (dial keys) as described above, various known key portions 151b may be adopted to control rotational operation of the latch ring member 153.

The latch ring member 153 may include the operating shaft 153a installed through the latch body 151a, an operating ring portion 153b provided at a first end of the operating shaft 153a and to which an anti-theft wire 30 is coupled, and an operating second end portion 153c provided at a second end of the operating shaft 153a and supporting the locking member 155. The latch ring member 153 may further include a blocking member 154 coupled to the operating second end portion 153c and preventing the locking member 155 from being separated.

The locking member 155 may include a locking body 155a coupled to the latch ring member 153, an elastic support portion 155b bent and extended from the locking body 155a and coupled to the latch body 151a of the latch member 151, and a locking engaging portion 155c bent and extended from the locking body 155a and engaged with or disengaged from the engaging patterns 133 of the slider 130 according to a change in the posture of the locking body 155a.

The locking body 155a has a plate structure. A coupling long hole h2 through which the operating second end portion 153c of the latch ring member 153 passes may be formed through the locking body 155a to allow the posture of the locking body 155a to be changed. The locking body 155a is elastically pressed toward the blocking member 154 by the elastic member 157.

The elastic support portion 155b is bent and extended from the locking body 155a, is coupled to and supported by the latch body 151a of the latch member 151. To this end, a member fixing hole h3 into which an elastic coupling portion 155d formed at a free end of the elastic support portion 155b is fitted is formed on the outside of the latch body 151a.

The locking engaging portion 155c extends from the locking body 155a separately from the elastic support portion 155b. A free end of the locking engaging portion 155c may be bent to be engaged with or disengaged from the engaging patterns 133.

Figure 11:
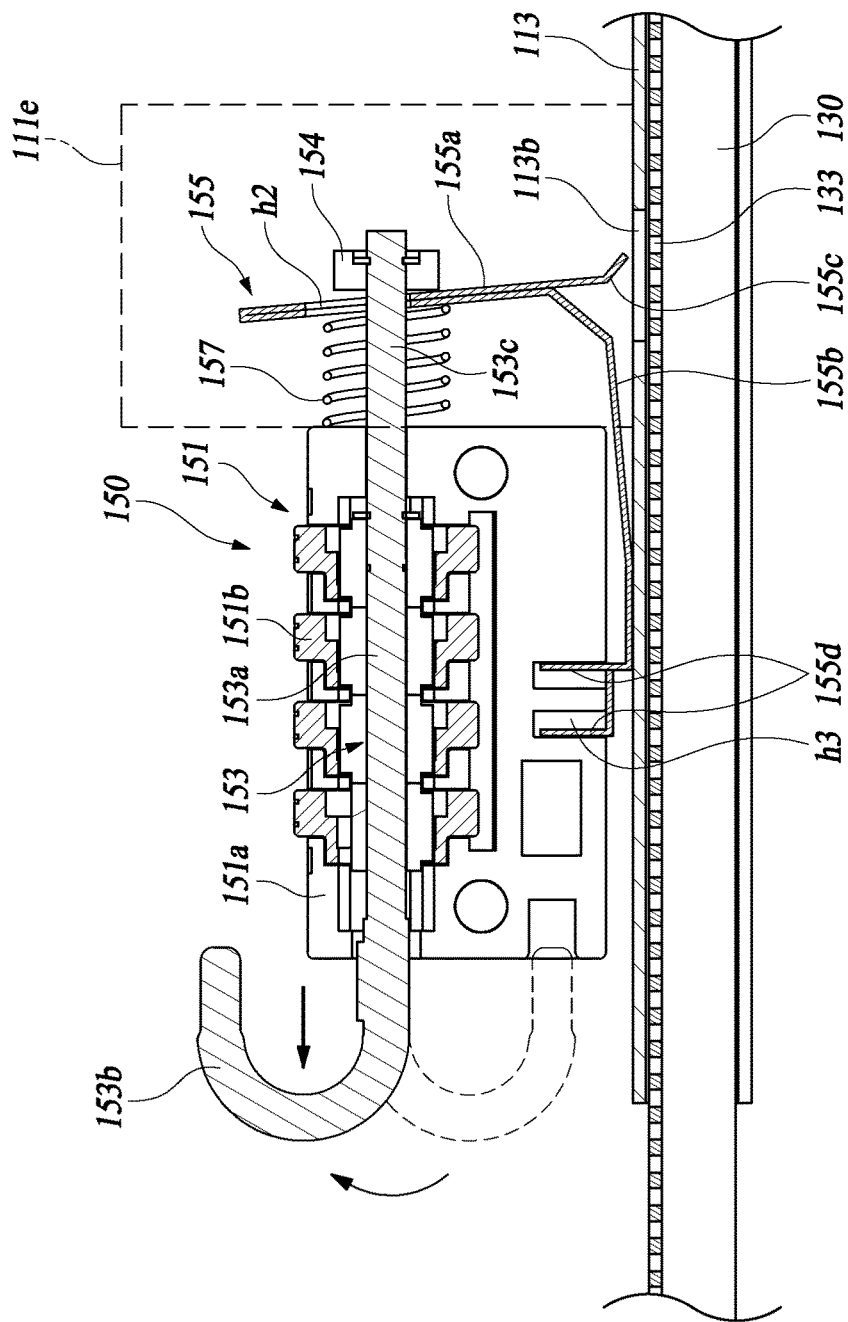
FIG. 11 is a sectional view illustrating that a locking and unlocking unit is in an unlocked state in the apparatus for locking the portable computer according to the embodiment of the present disclosure.

As illustrated in FIG. 11, when the latch ring member 153 is pulled to the unlocking position, the locking body 155a of the locking member 155 is pushed by the blocking member 154, causing a connection portion between the locking body 155a and the elastic support portion 155b to be elastically deformed. Then, the locking engaging portion 155c engaged with and locked to the engaging patterns 133 is disengaged therefrom. In this state, the slider 130 is allowed to be reciprocally moved relative to the guide rail 113.

The locking member 155 is accommodated inside the second support wall 111e so as not to be exposed to the outside.

The elastic member 157 may include a coil spring wound around the operating shaft 153a and the operating second end portion 153c of the latch ring member 153. The elastic member 157 elastically presses the locking body 155a of the locking member 155 in a direction away from the latch body 151a to maintain the locking engaging portion 153c in a state engaged with the engaging patterns 133.

The apparatus 100 for locking the portable computer 10 according to the embodiment of the present disclosure may further include the hub unit 160 and a cover member 170.

The hub unit 160 is coupled to the fastening rib 111f provided on the body housing 111 of the apparatus body 110. The hub unit 160 may include a hub body 161 coupled to the first mounting portion 111b provided on the body housing 111 of the apparatus body 110, and the signal cable 163 extending from the hub body 161.

A plurality of connection ports 161a are provided on the hub body 161. In addition, a mounting groove 160b coupled to the fastening rib 111f installed on the first mounting portion 111b is formed on a surface of the hub body 161.

The signal cable 163 is installed to pass through the through-hole 113b formed through the first support wall 111d of the first mounting portion 111b. A signal connector coupled to a port of the portable computer 10 is provided at a free end of the signal cable 163.

The cover member 170 is coupled to at least one of the apparatus body 110 and the hub unit 160 so as to cover the apparatus body 110 and the hub unit 160. In particular, the hub unit 160 is covered by the cover member 170 coupled to the apparatus body 110 so as not to be exposed to the outside. The connection ports 161a of the hub unit 160 are exposed to the outside when in use by opening an opening/closing door 171 of the cover member 170.

Here, the cover member 170 may serve to cover the locking and unlocking unit 150 so as not to be exposed to the outside, and may be detachably coupled to the apparatus body 110 in a one-touch manner so as to cover the outside of the apparatus body 110.

Hereinafter, the effects of the apparatus 100 for locking the portable computer 10 according to the embodiment of the present disclosure having the above configuration will be described.

Figure 12:
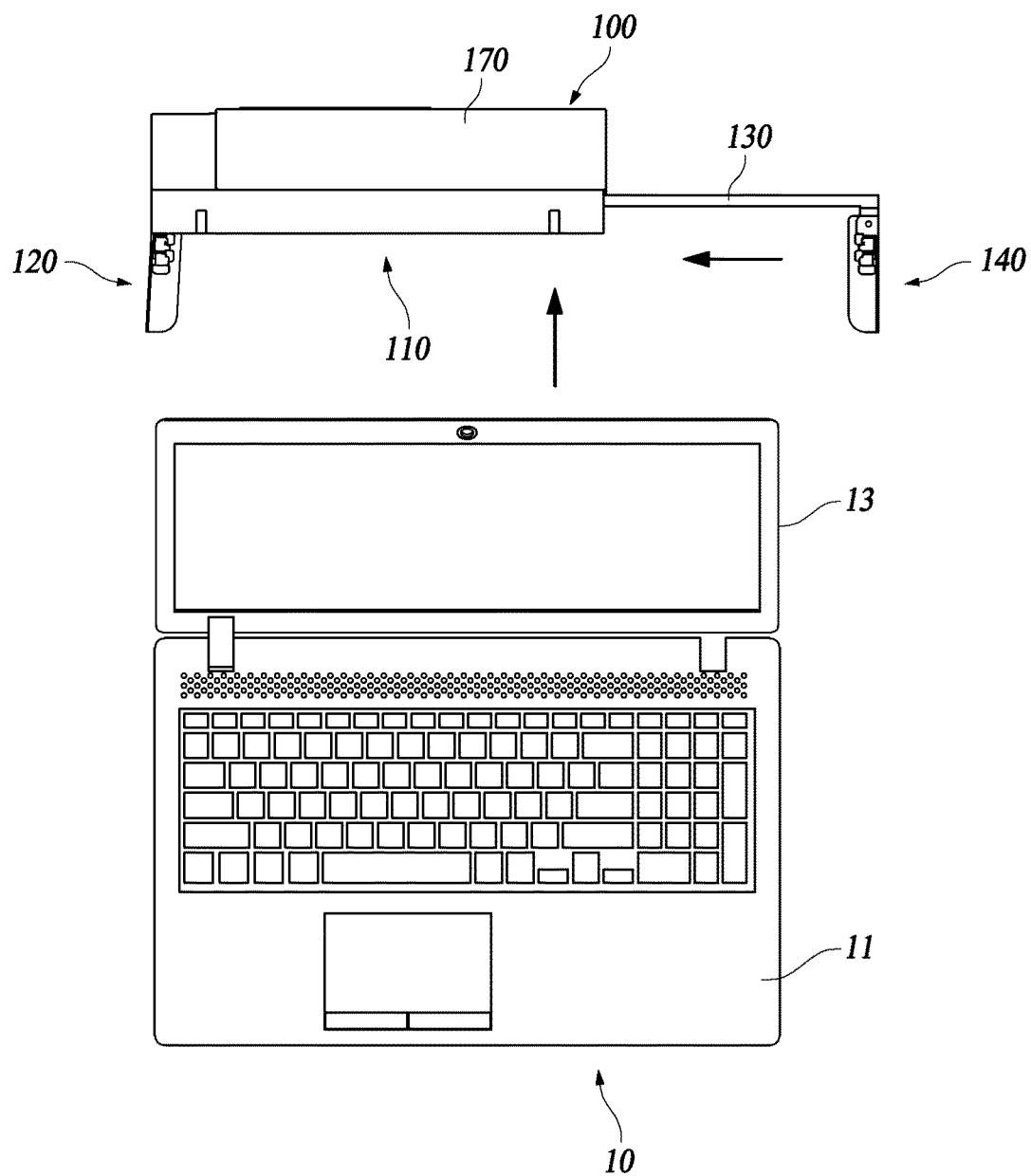
FIG. 12 is a plan view illustrating a state in which the apparatus for locking the portable computer according to the embodiment of the present disclosure is removed from the portable computer.

First, the first clamping member 120 and the second clamping member 140 are unfold by 90 degree angles relative to the apparatus body 110. After that, the first clamping member 120 and the second clamping member 140 are brought close to the computer body 11 in a state spaced apart from each other by a distance greater than a lateral width of the portable computer 10. Then, as illustrated in FIG. 12, since the slider 130 is in a state pulled out sufficiently long from the apparatus body 110, the first clamping member 120 and the second clamping member 140 are brought close to positions facing the first lateral edge 11a and the second lateral edge 11b without interfering with the opposite sides of the computer body 11. At this time, as illustrated in FIG. 11, the slider 130 is in a state released from the locking and unlocking unit 150. That is, the locking engaging portion 155c of the locking member 155 is disengaged from the engaging patterns 133.

Figure 13:
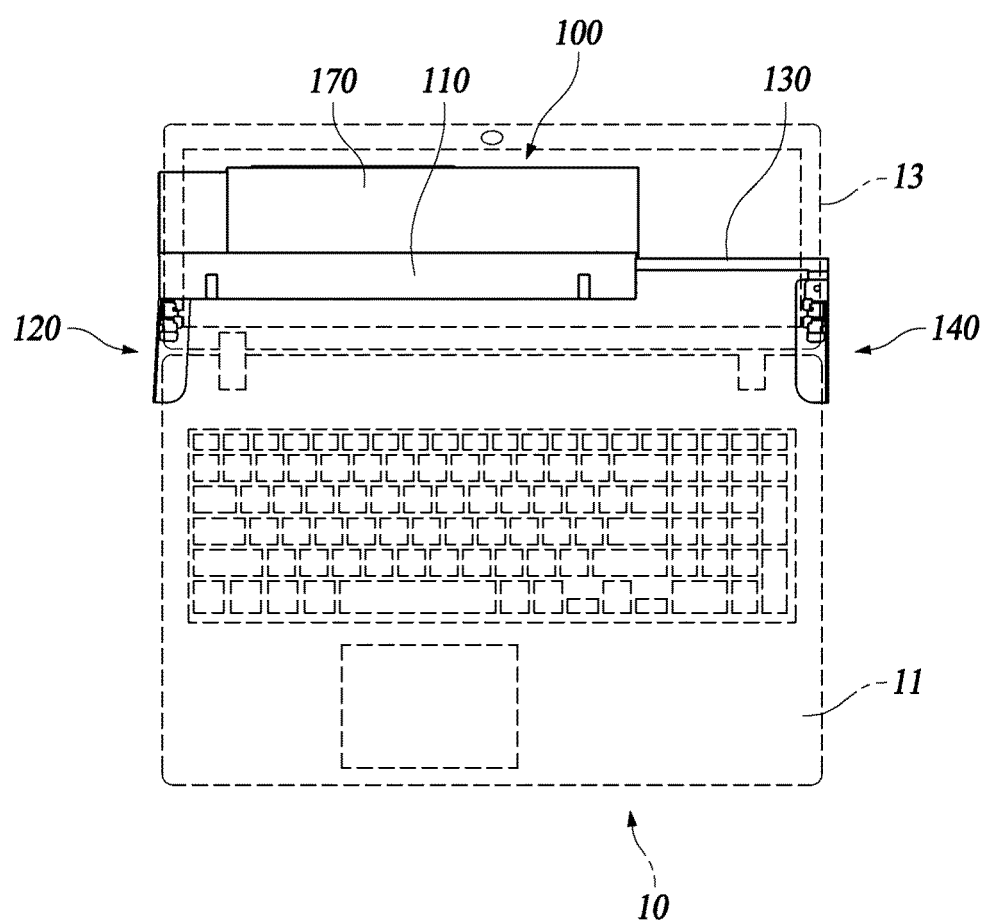
FIG. 13 is a plan view illustrating a state in which the apparatus for locking the portable computer according to the embodiment of the present disclosure is coupled to the portable computer.

Then, the first gripping member 120b and the second gripping member 140b are rotated relative to the first rotating member 120a and the second rotating member 140a, respectively, in response to a state in which the display 13 is unfolded relative to the computer body 11. In this state, as illustrated in FIG. 13, the first clamping member 120 is brought close to the first lateral edge 11a of the computer body 11 and coupled thereto, after which the second clamping member 140 is brought close to the second lateral edge 11b of the computer body 11 and coupled thereto.

Then, the first body support portion 121 of the first rotating member 120a and the second body support portion 141 of the second rotating member 140a are stacked and supported on a lower surface of the computer body 11, while the first edge of the display 13 is fitted into the first gripping recess of the first channel bracket and the second edge of the display 13 is fitted into the second gripping recess of the second channel bracket. Therefore, the portable computer 10 cannot be removed in a direction parallel to the first lateral edge 11a or the second lateral edge 11b of the computer body 11.

Then, in the state in which the first clamping member 120 and the second clamping member 140 are coupled to the portable computer 10, the anti-theft wire 30 is connected to the operating ring portion 153b of the latch ring member 153, and the latch ring member 153 is rotated and reciprocated to a locked state so as to have the same posture and position as indicated by a dotted line portion illustrated in FIG. 11.

When the latch ring member 153 is in the locked state, the locking member 155 returns to the locking position by elastic restoring force of the elastic member 157 installed at the operating second end portion 153c of the latch ring member 153. The locking engaging portion 155c of the locking member 155 returned to its original position is engaged with the engaging patterns 133 of the slider 130, thereby blocking relative sliding movement between the slider 130 and the guide rail 113 and fixing the posture of the apparatus 100 for locking the portable computer 10. Then, the latch ring member 153 is locked so as not to be freely moved to the unlocking position by manipulating the key portion 151b.

Therefore, a person other than an administrator cannot pull out the latch ring member 153 to the unlocking position by manipulating the key portion 151b of the latch member 151, and thus cannot remove the portable computer 10 from the apparatus 100 for locking the portable computer 10 according to the embodiment of the present disclosure. Then, the signal connector of the signal cable 163 of the hub unit 160 is connected to a port of the portable computer 10. Accordingly, it is possible to use all various ports provided on the computer body 11, while effectively preventing theft of the portable computer 10 provided for use by a large number of people in public places, etc.

Figure 10:
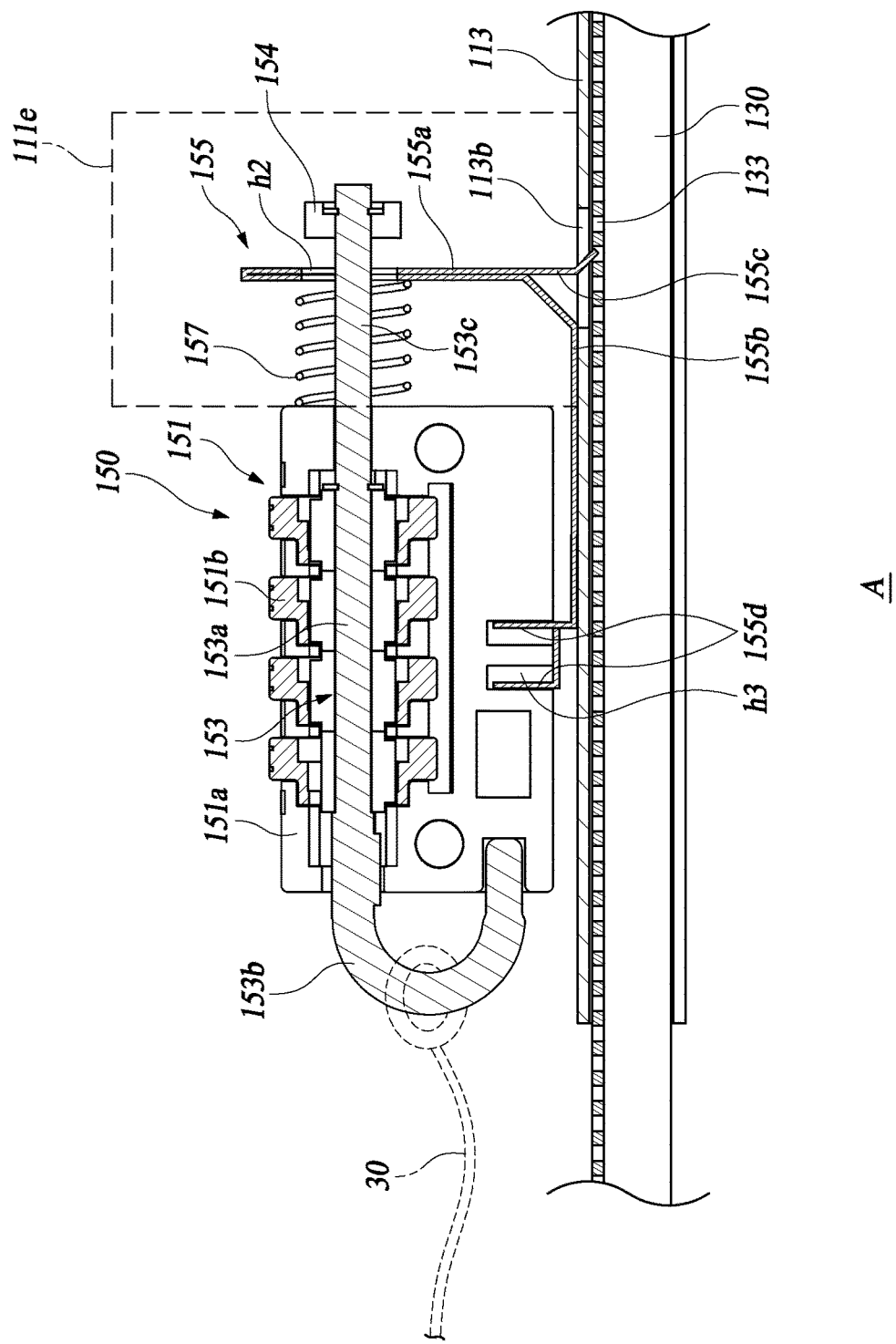
FIG. 10 is an enlarged view of part A of FIG. 9.

In order to remove the apparatus 100 for locking the portable computer 10 according to the embodiment of the present disclosure from the portable computer 10, the key portion 151b of the latch member 151 is manipulated in a state illustrated in FIG. 10, that is, a password of the dial keys is matched, to release the locked state of the latch ring member 153.

Then, the latch ring member 153 is pulled from the latch body 151a of the latch member 151 to the state illustrated in FIG. 11, after which the latch ring member 153b is rotated. Then, the blocking member 154 installed on the operating second end portion 153c of the latch ring member 153 presses the locking member 155 toward the latch member 151 to elastically deform the locking member 155, so that the locking engaging portion 155c is disengaged from the engaging patterns 133 and released from the locked state.

Then, since the locked state of the slider 130 is released, the slider 130 is moved to the first clamping member 120 and the second clamping member 140 are moved away from each other, and the portable computer 10 can be removed from the apparatus 100 for locking the portable computer 10 according to the present disclosure.

According to the apparatus 100 for locking the portable computer 10 described above, it is possible to implement the apparatus 100 for locking the portable computer 10, the apparatus 100 being capable of preventing theft of the portable computer 10 in a state in which a port of the portable computer 10 is usable by connecting an adaptor to the port. In particular, the apparatus 100 for locking the portable computer 10 according to the present disclosure can be firmly coupled to the portable computer 10, so that it is possible to prevent the apparatus 100 according to the present disclosure from being removed from the portable computer 10, and to prevent the apparatus 100 according to the present disclosure from being unintentionally separated from the portable computer 10. Furthermore, the apparatus 100 according to the present disclosure can be stored in a compact size when not in use, thereby facilitating storage and packaging.

Furthermore, with the configuration of the first clamping member 120, the display 13 can be freely rotated relative to the computer body 11, and a rotational movement range of the display 13 can be restricted so as not to completely cover the computer body 11.

Furthermore, with the configuration of the first gripping member 120b, gripping force on the display 13 can be increased, and the display 13 can be prevented from being separated from the first channel bracket. Furthermore, the maximum folding angle of the display 13 relative to the computer body 11 can be set through the first extension bracket 128.

Furthermore, with the configuration of the second clamping member 140, the display 13 can be freely rotated relative to the computer body 11, and a rotational movement range of the display 13 can be restricted so as not to completely cover the computer body 11.

Furthermore, with the configuration of the second gripping member 140b, gripping force on the display 13 can be increased, and the display 13 can be prevented from being separated from the second channel bracket. Furthermore, the maximum folding angle of the display 13 relative to the computer body 11 can be set through the second extension bracket 148.

Furthermore, with the configuration of the apparatus body 110, a smooth coupling of the slider 130 can be achieved.

Furthermore, with the configuration of the slider 130, locking engagement of the locking and unlocking unit 150 can be reliably achieved.

Furthermore, with the configuration of the locking and unlocking unit 150, the locked state and the unlocked state can be reliably achieved, and sliding movement of the slider 130 can be prevented. Furthermore, with the configuration of the locking member, locking engagement between the locking member and the engaging patterns 133 can be reliably achieved in the locked state and the unlocked state according to the change in the posture of the locking body.

Furthermore, with the configuration of the hub unit 160, the hub unit 160 can be integrated into the apparatus 100 according to the present disclosure so that the hub unit 160 can be used by connecting to a port of the portable computer 10, thereby facilitating convenience and expandability of use.

Furthermore, with the configuration of the cover member 170, the hub unit 160 coupled to the apparatus body 110 can be protected from the outside.

Although a preferred embodiment of the present disclosure has been described for illustrative purposes, those skilled in the art will appreciate that various modifications, additions, and substitutions are possible, without departing from the scope and spirit of the present disclosure as disclosed in the accompanying claims.

What is claimed is:

1. An apparatus for locking a portable computer, the apparatus comprising:
    an apparatus body;
    a first clamping member rotatably coupled to the apparatus body, configured to support a first side of a computer body of the portable computer, and configured to be fitted over a first edge of a display of the portable computer;
    a slider coupled to the apparatus body to be reciprocally movable;
    a second clamping member rotatably coupled to the slider while being spaced apart from the first clamping member, configured to support a second side of the computer body of the portable computer, and configured to be fitted over a second edge of the display of the portable computer; and
    a locking and unlocking unit installed on the apparatus body and configured to selectively restrict or allow movement of the slider,
    wherein the first clamping member comprises:
        a first rotating member rotatably coupled to the apparatus body, and configured to support the first side of the computer body; and
        a first gripping member rotatably coupled to the first rotating member in a direction orthogonal to a rotation direction of the first rotating member, and configured to be fitted over the first edge of the display.

2. The apparatus of claim 1, wherein the first gripping member comprises:
    a first channel bracket in which a first gripping recess into which the first edge of the display is fitted is recessed; and
    a first rotating bracket protruding from the first channel bracket so as to be rotatably coupled to the first rotating member.

3. The apparatus of claim 1, wherein the second clamping member comprises:
    a second rotating member rotatably coupled to the slider, and configured to support the second side of the computer body; and
    a second gripping member rotatably coupled to the second rotating member in a direction orthogonal to a rotation direction of the second rotating member, and configured to be fitted over the second edge of the display.

4. The apparatus of claim 3, wherein the second gripping member comprises:
    a second channel bracket in which a second gripping recess into which the second edge of the display is fitted is recessed; and
    a second rotating bracket protruding from the second channel bracket so as to be rotatably coupled to the second rotating member.

5. The apparatus of claim 1, wherein the apparatus body comprises:
    a body housing disposed on a rear edge of the computer body, and on which the locking and unlocking unit is installed; and
    a guide rail provided in the body housing so that the first clamping member is rotatably coupled to the guide rail, and to which the slider is coupled to be reciprocally movable.

6. The apparatus of claim 1, wherein the slider comprises:
    a plurality of engaging patterns arranged to be spaced apart from each other along a reciprocating movement direction of the slider, and configured to be selectively engaged with the locking and unlocking unit.

7. The apparatus of claim 1, wherein the locking and unlocking unit comprises:
    a latch member installed on the apparatus body;
    a latch ring member coupled to the latch member by passing therethrough so as to be reciprocally movable;
    a locking member connected to the latch ring member, and configured to be moved between a locking position locked to the slider and an unlocking position unlocked from the slider according to a movement direction of the latch ring member; and
    an elastic member configured to elastically press the locking member so as to allow the locking member to be moved to the locking position.

8. The apparatus of claim 7, wherein the locking member comprises:
    a locking body coupled to the latch ring member;
    an elastic support portion bent and extended from the locking body, and coupled to the latch member; and
    a locking engaging portion bent and extended from the locking body, and configured to be engaged with or disengaged from the engaging patterns of the slider according to a change in posture of the locking body.

9. The apparatus of claim 1, further comprising:
    a hub unit coupled to the apparatus body; and a cover member coupled to at least one of the apparatus body and the hub unit so as to cover the apparatus body and the hub unit.

10. An apparatus for locking a portable computer, the apparatus comprising:
an apparatus body;
a first clamping member rotatably coupled to the apparatus body, configured to support a first side of a computer body of the portable computer, and configured to be fitted over a first edge of a display of the portable computer;
a slider coupled to the apparatus body to be reciprocally movable;
a second clamping member rotatably coupled to the slider while being spaced apart from the first clamping member, configured to support a second side of the computer body of the portable computer, and configured to be fitted over a second edge of the display of the portable computer; and
a locking and unlocking unit installed on the apparatus body and configured to selectively restrict or allow movement of the slider,
wherein the second clamping member comprises:
a second rotating member rotatably coupled to the slider, and configured to support the second side of the computer body; and
a second gripping member rotatably coupled to the second rotating member in a direction orthogonal to a rotation direction of the second rotating member, and configured to be fitted over the second edge of the display.

11. The apparatus of claim 10, wherein the second gripping member comprises:
a second channel bracket in which a second gripping recess into which the second edge of the display is fitted is recessed; and
a second rotating bracket protruding from the second channel bracket so as to be rotatably coupled to the second rotating member.

12. The apparatus of claim 10, wherein the first clamping member comprises:
a first rotating member rotatably coupled to the apparatus body, and configured to support the first side of the computer body; and
a first gripping member rotatably coupled to the first rotating member in a direction orthogonal to a rotation direction of the first rotating member, and configured to be fitted over the first edge of the display, wherein the first gripping member comprises:
a first channel bracket in which a first gripping recess into which the first edge of the display is fitted is recessed; and
a first rotating bracket protruding from the first channel bracket so as to be rotatably coupled to the first rotating member.

13. The apparatus of claim 10, wherein the apparatus body comprises:
a body housing disposed on a rear edge of the computer body, and on which the locking and unlocking unit is installed; and
a guide rail provided in the body housing so that the first clamping member is rotatably coupled to the guide rail, and to which the slider is coupled to be reciprocally movable.

14. The apparatus of claim 10, wherein the slider comprises:

a plurality of engaging patterns arranged to be spaced apart from each other along a reciprocating movement direction of the slider, and configured to be selectively engaged with the locking and unlocking unit.

15. The apparatus of claim 10, wherein the locking and unlocking unit comprises:
a latch member installed on the apparatus body;
a latch ring member coupled to the latch member by passing therethrough so as to be reciprocally movable;
a locking member connected to the latch ring member, and configured to be moved between a locking position locked to the slider and an unlocking position unlocked from the slider according to a movement direction of the latch ring member; and
an elastic member configured to elastically press the locking member so as to allow the locking member to be moved to the locking position.

16. The apparatus of claim 15, wherein the locking member comprises:
a locking body coupled to the latch ring member;
an elastic support portion bent and extended from the locking body, and coupled to the latch member; and
a locking engaging portion bent and extended from the locking body, and configured to be engaged with or disengaged from the engaging patterns of the slider according to a change in posture of the locking body.

17. The apparatus of claim 10, further comprising:
a hub unit coupled to the apparatus body; and
a cover member coupled to at least one of the apparatus body and the hub unit so as to cover the apparatus body and the hub unit.

18. An apparatus for locking a portable computer, the apparatus comprising:
an apparatus body;
a first clamping member rotatably coupled to the apparatus body, configured to support a first side of a computer body of the portable computer, and configured to be fitted over a first edge of a display of the portable computer;
a slider coupled to the apparatus body to be reciprocally movable;
a second clamping member rotatably coupled to the slider while being spaced apart from the first clamping member, configured to support a second side of the computer body of the portable computer, and configured to be fitted over a second edge of the display of the portable computer; and
a locking and unlocking unit installed on the apparatus body and configured to selectively restrict or allow movement of the slider,
wherein the locking and unlocking unit comprises:
a latch member installed on the apparatus body;
a latch ring member coupled to the latch member by passing therethrough so as to be reciprocally movable;
a locking member connected to the latch ring member, and configured to be moved between a locking position locked to the slider and an unlocking position unlocked from the slider according to a movement direction of the latch ring member; and
an elastic member configured to elastically press the locking member so as to allow the locking member to be moved to the locking position.

19. The apparatus of claim 18, wherein the locking member comprises:
a locking body coupled to the latch ring member;

an elastic support portion bent and extended from the locking body, and coupled to the latch member; and a locking engaging portion bent and extended from the locking body, and configured to be engaged with or disengaged from the engaging patterns of the slider according to a change in posture of the locking body.

20. The apparatus of claim 18, wherein the slider comprises:

a plurality of engaging patterns arranged to be spaced apart from each other along a reciprocating movement direction of the slider, and configured to be selectively engaged with the locking member of the locking and unlocking unit.

\* \* \* \* \*